UNITED STATES PATENT OFFICE.

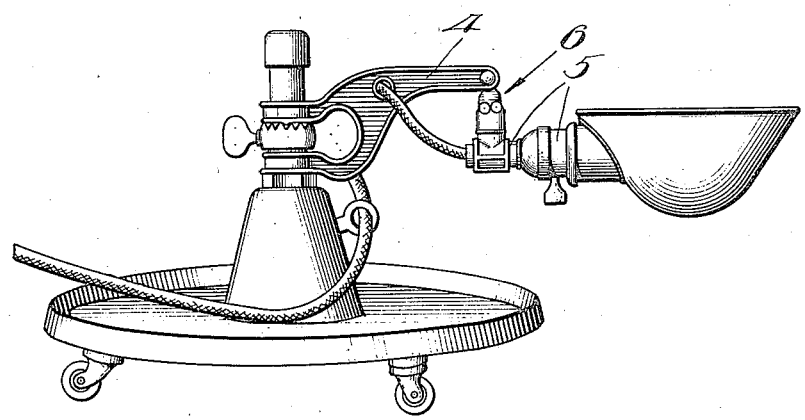
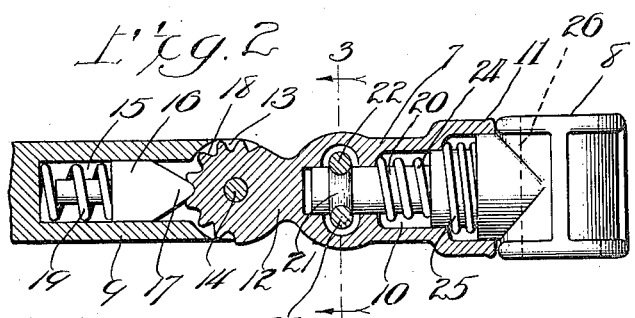
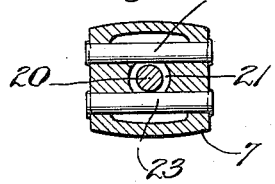

WILLIAM D. HERWIG, JR., OF CHICAGO, ILLINOIS.

UNIVERSAL JOINT.

1,318,148.  Specification of Letters Patent.  Patented Oct. 7, 1919.

Original application filed July 6, 1918, Serial No. 243,653. Divided and this application filed March 17, 1919. Serial No. 283,200.

*To all whom it may concern:*

Be it known that I, WILLIAM D. HERWIG, Jr., a citizen of the United States, and residing at Chicago, county of Cook, and State of Illinois, have invented certain new and useful Improvements in Universal Joints, of which the following is a specification.

This invention relates to certain improvements in universal joints for use in connection with lamp stands, lamp brackets and similar articles, wherein it is desired to provide means for turning one portion of the stand or bracket with respect to another in order to face the lamp or bracket in a desired position. This application is a division of my co-pending application for Letters Patent of the United States on improvements in portable lamp stands, Serial No. 243,653, which was filed July 6, 1918 and allowed October 14, 1918.

One of the objects of the invention is to provide a simple construction of universal joint and one which can be manufactured at a low cost. Another object is to provide a construction of universal joint such that it can be easily turned in any desired direction and which, nevertheless, will be of equal mechanical strength and durability in any position in which it may be turned.

Other objects and uses of the invention will appear from a detailed description of the same which consists in the features of construction and combinations of parts hereinafter described and claimed.

In the drawings: Figure 1 shows a perspective view of a lamp-stand to which the universal joint of the present invention has been applied; Fig. 2 shows a cross section on an enlarged scale through the central portion of the universal joint itself; and, Fig. 3 shows a section taken on the line 3—3 of Fig. 2 looking in the direction of the arrow.

For purposes of convenience, I have shown the universal joint of the present invention as being applied to a lamp-stand having a bracket 4 and lamp socket 5, the universal joint being designated in its entirety by the numeral 6 and being interposed between said bracket and said lamp socket. This is done only by way of illustration and for the purpose of showing one application of the construction of the present invention. I wish it clearly understood that in so illustrating an application of the universal joint of the present invention I do not limit myself to its use in this or any other particular combination.

Bearing the foregoing in mind, the universal joint comprises a central body member 7, a swivel member 8 and a bracket connection 9. The body member 7 has its end portion provided with a longitudinal bore or passage 10 reaching from its end 11 to a point near its rear end 12. This rear end in turn is preferably flattened and seats within a space 13 between the bifurcations of the bracket connection 9. A pin 14 establishes a pivoted connection between the bracket and the body member.

The bracket connection is provided with an inwardly extending bore 15 within which works a locking pin or lug 16. Said locking pin or lug has a tongue 17 on its outer end adapted to fit into a selected one of the serrations in the end portion 12 of the body member. A spring 19 forces the member 16 outwardly for this purpose, so as to lock the body member at a desired position into which it may be turned and retain it in such position with sufficient force to meet all ordinary requirements.

The swivel member 8 is provided with a lug 20 which extends into the opening 10 of the body member. Said lug terminates at a point adjacent to the end portion 12 of the body member, at which point the lug 20 is provided with a circular groove or recess 21. A pair of cross-pins 22 and 23 extended through the body member at this point, reach through the groove or recess 21, thereby locking the pin in position within the body member, while at the same time permitting the swivel member to rotate or turn with respect to the body member.

The lug portion 20 is preferably provided with a pair of shoulders, and the opening 10 of the body member is preferably provided with a pair of steps corresponding to said shoulders, so that the springs 24 and 25 seated between the shoulders and steps will exert a considerable outer force on the swivel member, tending to move it away from the body member and thus creating a substantial friction between the parts and particularly between the recess or groove 21 and the pins 22 and 23.

The swivel member may be provided with a transverse passage or opening 26 into which the socket 5 may be extended as a convenient method of attachment.

I claim:

1. As a new article of manufacture, a universal joint for the purpose specified, comprising in combination a body member having an upwardly extending circular socket, a swivel member having a transverse socket and having a lug rotatably mounted in the socket of the body member, there being an annular recess in said lug, a pair of pins extended through the body member and engaging the said recess, a spring working in the socket of the body member and forcing the swivel member endwise of the socket wherein said spring is mounted, a pivotal support for the free end of the body member and means for locking the body member in said support, substantially as described.

2. As a new article of manufacture, a universal joint for the purpose specified, comprising in combination a body member having an inwardly extending circular socket, a swivel member having a lug rotatably mounted in said socket, there being an annular recess in said lug, a pin extended through the body member and engaging said recess to lock the parts together, a spring working in the socket of the body member and forcing the swivel member endwise of the socket wherein said spring is mounted, a bifurcated member within which the body member is pivotally mounted, a plurality of serrations in the body member and a spring-pressed lug in the bifurcated member engaging said serrations, substantially as described.

3. As a new article of manufacture, a universal joint for the purpose specified, comprising in combination a body member having an inwardly extending circular socket, a swivel member having a lug rotatably mounted in the socket of the body member, there being an annular recess in said lug, a pin extended through the body member and engaging said recess, a spring working in the socket of the body member and forcing the swivel member endwise of the socket wherein said spring is mounted, and a suitable pivotal support for the free end of the body member, substantially as described.

WILLIAM D. HERWIG, Jr.